(12) United States Patent
Benedict, II et al.

(10) Patent No.: US 10,228,172 B2
(45) Date of Patent: Mar. 12, 2019

(54) REFRIGERANT LEVEL MONITOR FOR REFRIGERATION SYSTEM

(71) Applicant: Carrier Corporation, Farmington, CT (US)

(72) Inventors: Thomas J. Benedict, II, Syracuse, NY (US); Martin O. Johnsen, Jamesville, NY (US); Jason Scarcella, Cicero, NY (US)

(73) Assignee: CARRIER CORPORATION, Farmington, CT (US)

( * ) Notice: Subject to any disclaimer, the term of this patent is extended or adjusted under 35 U.S.C. 154(b) by 173 days.

(21) Appl. No.: 14/908,619

(22) PCT Filed: May 30, 2014

(86) PCT No.: PCT/US2014/040244
§ 371 (c)(1),
(2) Date: Jan. 29, 2016

(87) PCT Pub. No.: WO2015/017019
PCT Pub. Date: Feb. 5, 2015

(65) Prior Publication Data
US 2016/0169568 A1    Jun. 16, 2016

Related U.S. Application Data

(60) Provisional application No. 61/861,140, filed on Aug. 1, 2013.

(51) Int. Cl.
*B60P 3/20* (2006.01)
*F25B 45/00* (2006.01)
(Continued)

(52) U.S. Cl.
CPC ............... *F25B 45/00* (2013.01); *B60P 3/20* (2013.01); *F25B 40/02* (2013.01); *F25B 41/043* (2013.01);
(Continued)

(58) Field of Classification Search
CPC . F25B 2345/003; F25B 45/00; F25B 2600/05
See application file for complete search history.

(56) References Cited

U.S. PATENT DOCUMENTS 3,753,356 A * 8/1973 Kramer ................ F25B 41/006
62/125
4,612,775 A    9/1986 Branz et al.
(Continued)

FOREIGN PATENT DOCUMENTS

| CN | 101506600 A | 8/2009 |
| CN | 101512255 A | 8/2009 |

(Continued)

OTHER PUBLICATIONS

Chinese First Office Action and Search Report for application CN 201480043516.2, dated Jun. 7, 2017, 7pgs.
(Continued)

*Primary Examiner* — Ana M Vazquez
(74) *Attorney, Agent, or Firm* — Cantor Colburn LLP

(57) ABSTRACT

A refrigeration system includes a refrigerant vapor compression unit including a compressor and one or more current sensors to determine a total system current draw. One or more pressure sensors are positioned to determine a refrigerant pressure in the refrigerant vapor compression unit. A controller compares the current draw on the system and the refrigerant pressure to selected acceptable ranges and determines a level of refrigerant charge in the refrigerant vapor compression unit. A method of determining a level of refrigerant charge in a refrigeration system includes mea- (Continued)

suring a refrigerant pressure in the refrigeration system and sensing a current draw of the refrigeration system. A level of refrigerant charge in the refrigeration system is calculated from the refrigerant pressure and the current draw.

18 Claims, 3 Drawing Sheets

(51) Int. Cl.
*F25B 40/02* (2006.01)
*F25B 49/00* (2006.01)
*F25B 41/04* (2006.01)
*F25B 49/02* (2006.01)

(52) U.S. Cl.
CPC ............ *F25B 49/005* (2013.01); *F25B 49/02* (2013.01); *F25B 2345/003* (2013.01); *F25B 2600/05* (2013.01); *F25B 2700/151* (2013.01); *F25B 2700/1933* (2013.01)

(56) References Cited

U.S. PATENT DOCUMENTS

| | | | |
|---|---|---|---|
| 4,755,957 A | | 7/1988 | White et al. |
| 4,829,777 A | | 5/1989 | Matsuoka et al. |
| 5,079,930 A | | 1/1992 | Beaverson et al. |
| 5,150,584 A | | 9/1992 | Tomasov et al. |
| 5,398,516 A | | 3/1995 | Kuribara et al. |
| 5,860,286 A | | 1/1999 | Tulpule |
| 6,148,627 A | * | 11/2000 | Reason ................ F25B 49/022 62/217 |
| 6,293,114 B1 | | 9/2001 | Kamemoto |
| 6,460,354 B2 | | 10/2002 | Yabuki et al. |
| 7,188,482 B2 | | 3/2007 | Sadegh et al. |
| 7,594,407 B2 | | 9/2009 | Singh et al. |
| 7,891,201 B1 | | 2/2011 | Bush et al. |
| 8,109,104 B2 | | 2/2012 | Doll et al. |
| 2005/0109050 A1 | | 5/2005 | Laboe et al. |
| 2005/0235660 A1 | * | 10/2005 | Pham ...................... F04C 28/00 62/126 |
| 2012/0117989 A1 | | 5/2012 | Turney et al. |
| 2012/0192579 A1 | * | 8/2012 | Huff .................... B60H 1/3232 62/115 |
| 2013/0160470 A1 | | 6/2013 | Schuster et al. |

FOREIGN PATENT DOCUMENTS

| | | |
|---|---|---|
| CN | 101688714 A | 3/2010 |
| CN | 202432782 U | 9/2012 |
| CN | 103122844 A | 5/2013 |
| EP | 2040016 A2 | 3/2009 |
| GB | 2260816 A | 2/1993 |
| WO | 9320393 A1 | 10/1993 |
| WO | 2009018624 A1 | 2/2009 |

OTHER PUBLICATIONS

Haorong Li et al., "Virtual Refrigerant Charge Sensor," 2008 ACEEE Study on Energy Efficiency in Buildings; pp. 3-209 through 3-219; http://www.aceee.org/files/proceedings/2008/data/papers/3_514.pdf.

Notification of Transmittal of the International Search Report and the Written Opinion of the International Searching Authority, or the Declaration; Application No. PA-0027253WO; dated Aug. 26, 2014; 11 pages.

Chinese Office Action Issued in CN Application No. 201480043516.2, dated Jul. 27, 2018, 7 Pages.

* cited by examiner

REFRIGERANT LEVEL MONITOR FOR REFRIGERATION SYSTEM

BACKGROUND

The subject matter disclosed herein relates to refrigeration systems. More specifically, the subject matter disclosed herein relates to determination and monitoring of refrigerant levels in refrigeration systems.

Fruits, vegetables and other perishable items, including meat, poultry and fish, fresh or frozen, are commonly transported in the cargo box of a truck or trailer, or in an intermodal container. Accordingly, it is customary to provide a transportation refrigeration system in operative association with the cargo box for cooling the atmosphere within the cargo box. The transport refrigeration system includes a refrigerant vapor compression system, also referred to as a transport refrigeration unit, and an on-board power unit. The refrigerant vapor compression system typically includes a compressor, a condenser, an expansion device and an evaporator serially connected by refrigerant lines in a closed refrigerant circuit in accord with known refrigerant vapor compression cycles. The power unit includes an engine, typically diesel powered.

The system is charged with a selected volume of refrigerant, which is held in a receiver, or holding tank, sufficient to allow for a desired amount of refrigeration over a wide range of operating temperatures. In a typical system, the receiver includes one or more sight glasses to allow an operator to visually assess the refrigerant charge level present in the receiver. When adding refrigerant in the field (when refrigerant charge in the system cannot be weighed), sight glasses are used to verify a correct amount of refrigerant added to the receiver to result in an acceptable level of refrigerant in the receiver. Sight glasses are also used to periodically determine if the system is over charged or under charged. Accuracy in determining the level of refrigerant charge via the sight glasses can be unreliable, as the method is dependent on the conditions under which the system is operating when the refrigerant level is checked. At certain operating conditions, the system can appear to be undercharged or overcharged based on the sight glass observation, but may in fact be properly charged.

BRIEF SUMMARY

In one embodiment, a refrigeration system includes a refrigerant vapor compression unit including a compressor and one or more current sensors to determine a total system current draw. One or more pressure sensors are positioned to determine a refrigerant pressure in the refrigerant vapor compression unit. A controller compares the current draw on the system and the refrigerant pressure to selected acceptable ranges and determines a level of refrigerant charge in the refrigerant vapor compression unit.

In another embodiment, a method of determining a level of refrigerant charge in a refrigeration system includes measuring a refrigerant pressure in the refrigeration system and sensing a current draw of the refrigeration system. A level of refrigerant charge in the refrigeration system is calculated from the refrigerant pressure and the current draw.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
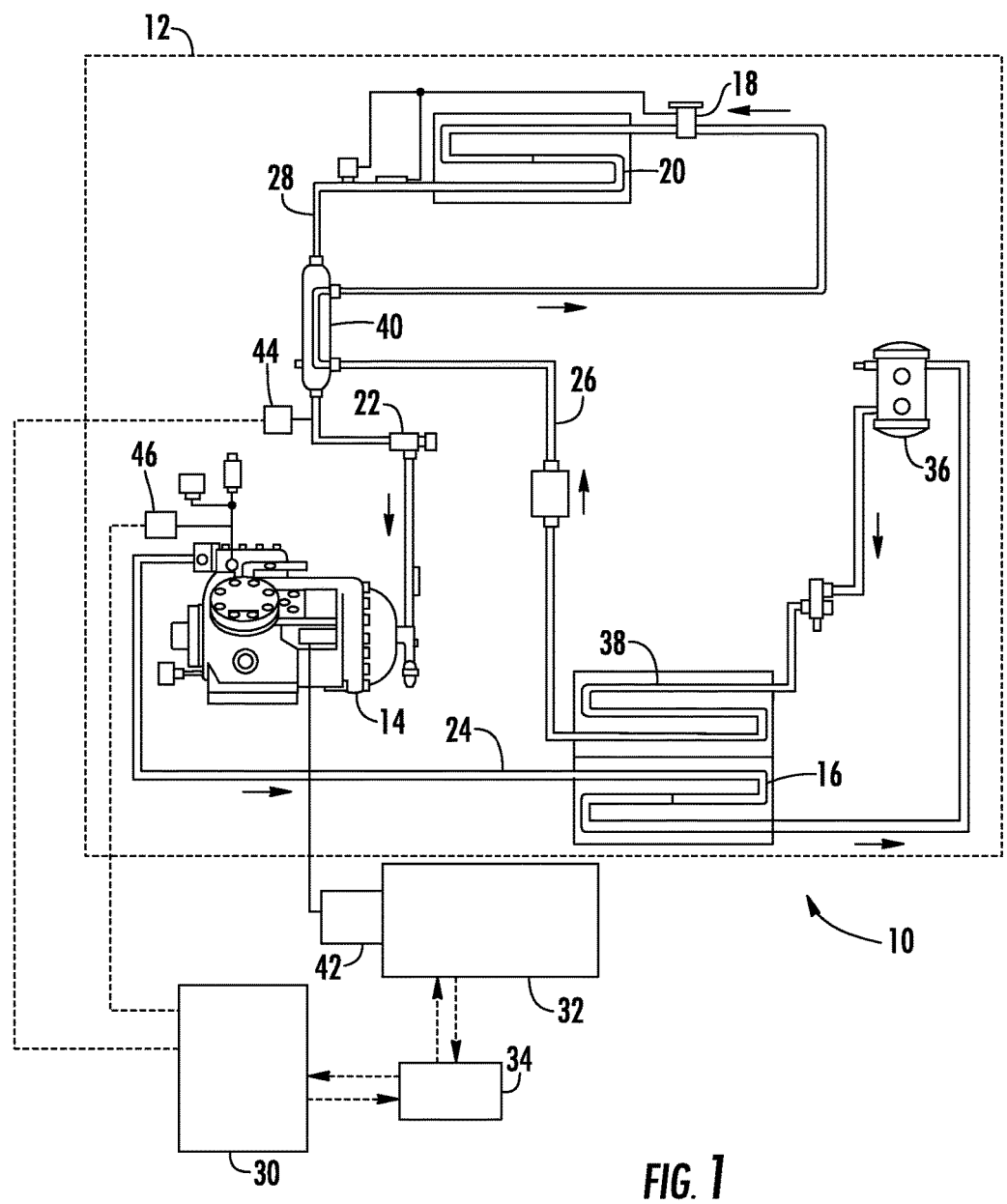
FIG. 1 is a schematic view of an embodiment of a transport refrigeration system.

The detailed description explains embodiments of the invention, together with advantages and features, by way of example with reference to the drawing.

DETAILED DESCRIPTION

Figure 2:
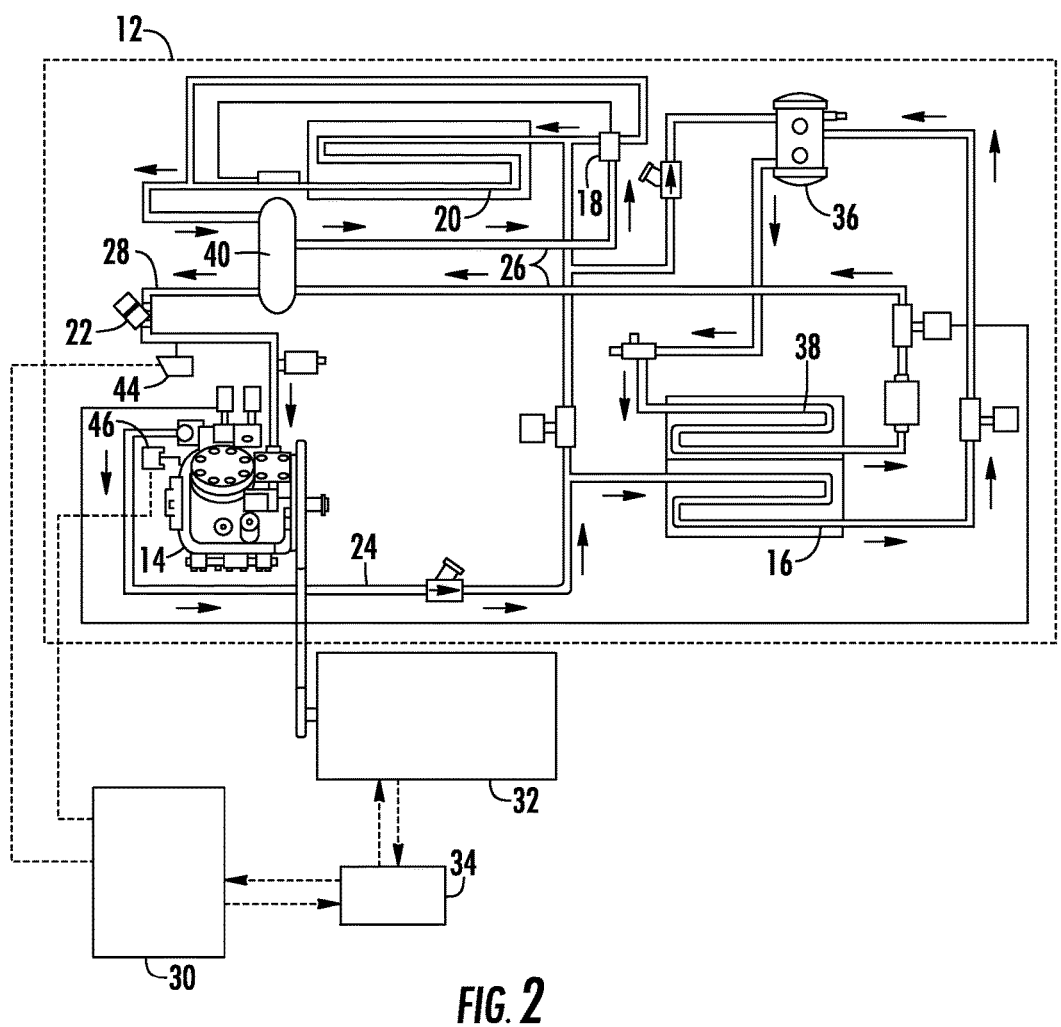
FIG. 2 is a schematic view of another embodiment of a transport refrigeration system.

Referring initially to FIGS. 1 and 2, there are depicted exemplary embodiments of transport refrigeration systems for cooling the atmosphere within the cargo box of a truck, trailer, container, intermodal container or similar cargo transportation unit. The transportation refrigeration system 10 includes a transport refrigeration unit 12 including a compressor 14, a refrigerant heat rejecting heat exchanger 16 (e.g., condenser or gas cooler), an expansion device 18, a refrigerant evaporator heat exchanger 20 and a suction modulation valve 22 connected in a closed loop refrigeration circuit including refrigerant lines 24, 26 and 28 and arranged in a conventional refrigeration cycle. The transport refrigeration system 10 further includes an electronic system controller 30, a diesel engine 32 and an engine controller 34. The transport refrigeration system 10 is mounted as in conventional practice to an exterior wall of the truck, trailer or container with the compressor 14 and the heat rejecting heat exchanger 16 with its associated condenser fan(s) (not shown) and diesel engine 32 disposed externally of the refrigerated cargo box.

As is conventional practice, when the transport refrigeration unit 12 is operating in a cooling mode, low temperature, low pressure refrigerant vapor is compressed by the compressor 14 to a high pressure, high temperature refrigerant vapor and passed from the discharge outlet of the compressor 14 into refrigerant line 24. The refrigerant circulates through the refrigerant circuit via refrigerant line 24 to and through the heat exchange tube coil or tube bank of the heat rejecting heat exchanger 16, wherein the refrigerant vapor condenses to a liquid, thence through the receiver 36, which provides storage for excess liquid refrigerant, and thence through the subcooler coil 38 of the heat exchanger. The subcooled liquid refrigerant then passes through refrigerant line 24 through a first refrigerant pass of the refrigerant-to-refrigerant heat exchanger 40, and thence traverses the expansion device 18 before passing through the evaporator heat exchanger 20. In traversing the expansion device 18, which may be an electronic expansion valve (EXV) as depicted in FIG. 1 or a mechanical thermostatic expansion valve (TXV) as depicted in FIG. 2, the liquid refrigerant is expanded to a lower temperature and lower pressure prior to passing to the evaporator heat exchanger 20.

In flowing through the heat exchange tube coil or tube bank of the evaporator heat exchanger 20, the refrigerant evaporates, and is typically superheated, as it passes in heat exchange relationship return air drawn from the cargo box passing through the airside pass of the evaporator heat exchanger 20. The refrigerant vapor thence passes through the refrigerant line 26, the refrigerant vapor traverses a second refrigerant pass of the refrigerant-to refrigerant heat exchanger 40 in heat exchange relationship with the liquid refrigerant passing through the first refrigerant pass thereof. Before entering the suction inlet of the compressor 14, the refrigerant vapor passes through the suction modulation valve 22 disposed in refrigerant line 26 downstream with respect to refrigerant flow of the refrigerant-to-refrigerant heat exchanger 40 and upstream with respect to refrigerant flow of the compressor 14. By selectively reducing the open flow area through the suction modulation valve 22, the controller 30 can selectively restrict the flow of refrigerant vapor supplied to the compressor 14, thereby reducing the capacity output of the transportation refrigeration unit 12 and in turn reducing the power demand imposed on the engine 32.

Air drawn from within the cargo box by the evaporator fan(s) (not shown) associated with the evaporator heat exchanger 20, is passed over the external heat transfer surface of the heat exchange tube coil or tube bank of the evaporator heat exchanger 20 and circulated back into the interior space of the cargo box. The air drawn from the cargo box is referred to as "return air" and the air circulated back into the cargo box is referred to as "supply air". It is to be understood that the term "air" as used herein includes mixtures of air and other gases, such as for example, but not limited to nitrogen or carbon dioxide, sometimes introduced into a refrigerated cargo box for transport of perishable product such as produce.

Although the particular type of evaporator heat exchanger 20 used is not limiting of the invention, the evaporator heat exchanger 20 may, for example, comprise one or more heat exchange tube coils, as depicted in the drawing, or one or more tube banks formed of a plurality of tubes extending between respective inlet and outlet manifolds. The tubes may be round tubes or flat tubes and may be finned or un-finned. One or more pressure sensors 44 are located in the refrigeration unit 12, and one or more current sensors 46 are located at, for example, the compressor 14. During operation of the refrigeration system 10, the pressure sensors 44 and the current sensors 46 monitor refrigerant pressure and/or current draw at the compressor 14. The information collected by the pressure sensors 44 and current sensors 46 is transmitted to the controller 30, where the controller 30 compares the information to preselected acceptable ranges of pressure and current, based on the conditions under which the refrigeration unit 12 is operating during measurement, such as open area percent of the suction modulation valve 22. It is to be appreciated that in other embodiments, other valves, such as an electronic expansion valve (not shown) may be utilized. In some embodiments, the open area is determined by measuring air or refrigerant temperatures in the transport refrigeration system. If the refrigerant pressure and/or compressor 14 current draw is outside of the acceptable ranges, the controller 30 will trigger an alarm, such as an audible alarm or a light or message displayed at a control panel to indicate that a refrigerant charge in the refrigeration unit 12 is outside of the acceptable range, either higher or lower than desired. For example, if a current draw at the compressor 14 is higher than allowed by the selected range, it may be indicative of an excess of refrigerant charge. Similarly, if a refrigerant pressure exceeds an upper limit of the acceptable range, it may indicate an excess of refrigerant charge in the refrigeration unit 12.

The controller 30 may continuously monitor the pressure and current, or such measurements may be collected by the controller at selected time intervals, or when the refrigeration system 10 is initially started after being idle. Further, the pressure and temperature sensors may be utilized to verify a correct amount of refrigerant was added during maintenance of the refrigeration system 10.

Figure 3:
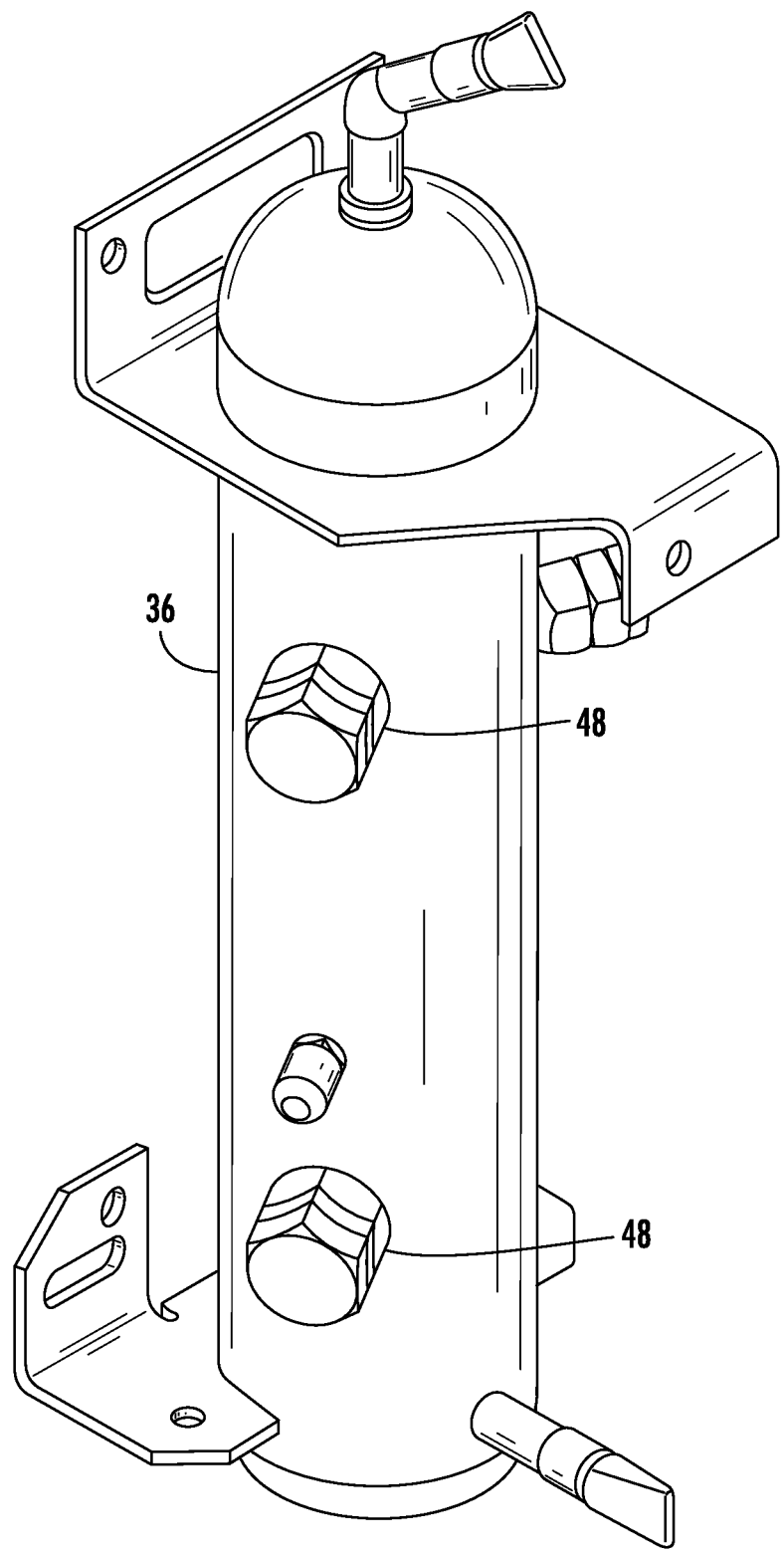
FIG. 3 is a schematic view of an embodiment of a receiver for a transport refrigeration system.

Referring to FIG. 3, the pressure sensors 44 and current sensors 46 may be used in with one or more sight glasses 48 located at the receiver 36. An operator may use the sight glass 48 to visually verify a correct level of the refrigerant in the receiver, especially that the refrigerant level or charge is not too low.

While the above disclosure is related to transport refrigeration systems, one skilled in the art will recognize that elements of the present disclosure are also applicable to other vaport compression refrigeration systems.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A refrigeration system comprising:
   a refrigerant vapor compression unit including a compressor;
   one or more current sensors operably connected to the compressor, the one or more current sensors configured to monitor a current draw on the compressor;
   one or more pressure sensors configured to monitor a refrigerant pressure in the refrigerant vapor compression unit; and
   a controller operably connected to the one or more current sensors and the one or more pressure sensors and configured to compare the monitored current draw on the unit and the monitored refrigerant pressure to selected acceptable ranges and determine a level of refrigerant charge in the refrigerant vapor compression unit based on a result of the comparison.

2. The refrigeration system of claim 1, further comprising one or more sight glasses disposed at a receiver of the refrigerant vapor compression unit.

3. The refrigeration system of claim 1, wherein the controller is configured to compare the level of refrigerant charge to preselected limits.

4. The refrigeration system of claim 3, wherein the controller triggers an alarm when the level of refrigerant charge is above or below the preselected limits.

5. The refrigeration system of claim 1, further comprising a valve to regulate a flow of refrigerant to the compressor, a percent open area of the valve utilized to determine the acceptable ranges.

6. The refrigeration system of claim 5, wherein the valve is a suction modulation valve.

7. The refrigeration system of claim 1, wherein the refrigeration system is a transport refrigeration system.

8. The refrigeration system of claim 1, further comprising:
   a condenser;
   an evaporator; and
   a refrigerant to refrigerant heat exchanger disposed along a refrigerant pathway extending from the evaporator to the compressor;

wherein the pressure sensor is disposed along the refrigerant pathway between the refrigerant to refrigerant heat exchanger and the compressor.

9. A method of determining a level of refrigerant charge in a refrigeration system comprising:
measuring a refrigerant pressure in the refrigeration system;
sensing a current draw of the refrigeration system; and
calculating the level of refrigerant charge in the refrigeration system from the refrigerant pressure and the current draw.

10. The method of claim 9, further comprising comparing the level of refrigerant charge to an acceptable range of refrigerant charge.

11. The method of claim 10, further comprising regulating a flow of refrigerant into a compressor via a valve.

12. The method of claim 11, further comprising utilizing a percent open area of the valve to determine the acceptable range.

13. The method of claim 12, further comprising:
measuring an air or refrigerant temperature in the refrigeration system; and
utilizing the measured temperature to determine the percent open area.

14. The method of claim 10, further comprising triggering an alarm when the level of refrigerant charge is outside of the acceptable range.

15. The method of claim 9, wherein the refrigerant pressure is measured via one or more pressure sensors.

16. The method of claim 15, wherein the one or more pressure sensors operate substantially continuously.

17. The method of claim 9, further comprising verifying the level of refrigerant charge via one or more sight glasses disposed at a receiver of the refrigeration system.

18. The method of claim 9, wherein the refrigeration system is a transport refrigeration system.

* * * * *